United States Patent Office 3,685,981
Patented Aug. 22, 1972

3,685,981
COMBATING UNWANTED VEGETATION WITH
N-DIMETHYLOXAZOLYL SULFANILAMIDES
Loren W. Hedrich, Overland Park, Kans., assignor to Gulf Research & Development Company, Pittsburgh, Pa.
No Drawing. Filed Nov. 7, 1969, Ser. No. 874,999
Int. Cl. A01n 9/00
U.S. Cl. 71—88                   3 Claims

ABSTRACT OF THE DISCLOSURE

A class of sulfanilamide derivatives previously known as bactericides has been found to have valuable herbicidal properties. In particular, $N^1$-(4,5-dimethyl-2-oxazolyl) sulfanilamide has been found to be useful in combating perennial Johnson grass.

DESCRIPTION OF INVENTION

The p-aminobenzenesulfonyl derivatives of the 2-aminooxazoles and methods of synthesis are described in U.S. Pats. 2,809,966 and 3,052,673. Both the p-aminobenzenesulfonyl and p-acetamidobenzenesulfonyl compounds may be either purchased as fine chemicals or synthesized by means of published procedures. The use of the compounds as herbicides is illustrated below.

USE OF THE HERBICIDES

So as to illustrate clearly the selectively phytotoxic properties of the compounds, a group of controlled greenhouse experiments is described below.

(1) Post emergent use

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots planted with each species were sprayed with an aqueous dispersion of the active compound prepared as described above, at a rate of 5 lbs. of active compound per acre and at a spray volume of 60 gallons per acre. Approximately one week after the spray application the plants were observed and the results rated according to the following schedule:

Type of action

C=Chlorosis (bleaching)
N=Necrosis
G=Growth inhibition
F=Formative effect (abnormal form of growth)
K=Non-emergence Degree 0=No effect
1=Slight effect
2=Moderate effect
3=Severe effect
4=Maximum effect (all plants died).

The compounds of the present invention are characterized by delayed effects which may appear more than two weeks after spraying. For this reason the plants are best held another two weeks in the greenhouse for a final observation and possible revision of the ratings.

The same rating schedule was employed to judge pre-emergent results obtained according to the procedure described below.

(2) Pre-emergent use

A solution of each active compound was prepared by dissolving 290 mg. of the compound to be tested in 200 ml. of acetone. Disposable expanded polystyrene trays about 3 inches deep and about 1 square foot in area were prepared and seeded with a variety of species of plant seeds, then sprayed with the acetone solution at the rate of 10 lbs. of active chemical per acre of sprayed area, after which the seeds were covered with about ¼ inch of soil. Trays which had been seeded with alfalfa, brome, flax, oats, radishes and sugar beets were held at 85° F. At fourteen to twenty-one days after corn, coxcomb, cotton, crabgrass, millet and soybeans were held at 85° F. At fourteen to twenty-one days after seeding and treatment the trays were examined and herbicidal effects were rated according to the above schedule.

Both post-emergent and pre-emergent results are set forth in the following table.

TABLE 1.—HERBICIDAL USE OF SULFANILAMIDE DERIVATIVES

| Structural formula | Treatment | Crab-grass | Cox-comb | Brome | Millet | Soy-bean | Cotton | Alfalfa | Oats | Corn | Flax | Radish | Sugar beet | Wheat | Grain sorghum | Tomato |
|---|---|---|---|---|---|---|---|---|---|---|---|---|---|---|---|---|
| 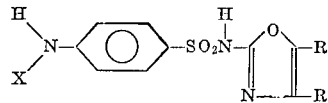 | Postemergence | N4 | | | C1 / N1 | N2 / C1 | C1 | C1 | C1 | C1 | C1 | C1 | C2 / G1 | C2 / G2 | C1 | F2 / G1 |
|  | Preemergence | | N3 / G2 | N4 | N4 | C3 / G2 | C2 / G2 | N4 | C3 / G3 | C2 / G1 | K4 | K4 | | | C1 | C1 |
| 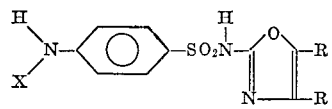 | Postemergence | | | | 0 | C1 | 0 | 0 | 0 | 0 | 0 | 0 | N1 / G1 | 0 | 0 | 0 |
|  | Preemergence | N4 | | C3 / G3 | N4 | C2 / G1 | G1 | C3 / G3 | C1 | K4 | K4 | 0 | C2 / G1 | | | |

3. The method of combating crabgrass consisting of applying to the locus of the grass seed a herbicidally effective amount of a compound having the structural formula $$\underset{X}{H} N - \underset{}{\bigcirc} - SO_2 \underset{H}{N} - \underset{N}{\overset{O}{\fbox{}}} \underset{R}{\overset{R}{}}$$

As indicated by the tabulated results of greenhouse tests, the compounds employed in this method may be used to prevent emergence of crabgrass and other weeds in a number of standing crops. Of particular interest is the apparent ability of the acetylated compound to be used in tomato fields to prevent emergence of noxious grasses without substantial injury to tomato plants.

In further use outdoors, the p-aminobenzene-sulfonyl compound was formulated as an emulsifiable concentrate according to published directions recommended by the manufacturer of a commercial emulsifier and was sprayed directly at the rate of 8 lbs. per acre and 20 to 30 gal. per acre spray volume on mature perennial Johnson grass. After only one application, approximately 90 percent of the Johnson grass was killed. Substantially complete control of Johnson grass with only two applications of the p-aminobenzenesulfonyl compound is feasible, whereas a commercial herbicide sold for this specific purpose may require from six to ten repeated applications.

I claim:
1. The method of combating unwanted vegetation consisting of applying to the locus of the vegetation a herbicidal amount of a compound having the structural formula

$$\underset{X}{H} N - \underset{}{\bigcirc} - SO_2 \underset{H}{N} - \underset{N}{\overset{O}{\fbox{}}} \underset{R}{\overset{R}{}}$$

in which X is selected from the group consisting of hydrogen and acetyl and R is selected from the group consisting of alkyl substituents having from 1 to 3 carbon atoms.

2. The method of combating perennial Johnson grass consisting of applying to the locus of the grass an effective amount of $N^1$ - (4,5-dimethyl-2-oxazolyl)-sulfanilamide.

3. The method of combating crabgrass consisting of applying to the locus of the grass seed a herbicidally effective amount of a compound having the structural formula $$\underset{X}{H} N - \underset{}{\bigcirc} - SO_2 \underset{H}{N} - \underset{N}{\overset{O}{\fbox{}}} \underset{R}{\overset{R}{}}$$

in which X is selected from the group consisting of hydrogen and acetyl and R is selected from the group consisting of alkyl substituents having from 1 to 3 carbon atoms.

References Cited

UNITED STATES PATENTS

| | | | |
|---|---|---|---|
| 3,498,780 | 3/1970 | Soper et al. | 71—103 |
| 3,482,957 | 12/1969 | Ueno et al. | 71—103 X |
| 3,573,028 | 3/1971 | Ueno et al. | 71—103 X |

JAMES O. THOMAS, Jr., Primary Examiner

PO-1050
(5/69)

UNITED STATES PATENT OFFICE
CERTIFICATE OF CORRECTION

Patent No. 3,685,981          Dated  August 22, 1972

Inventor(s)  Loren W. Herdich

It is certified that error appears in the above-identified patent and that said Letters Patent are hereby corrected as shown below:

Column 2, line 52, the number "85°F." should be deleted and add the phrase --75°F. day temperature,-- to be correct. Column 2, lines 52, 53, 54, the sentence "At fourteen to twenty one days after corn, coxcomb, cotton, crabgrass, millet and soybeans were held at 85°F." should be deleted to read as --Trays seeded with corn, coxcomb, cotton, crabgrass, millet and soybeans was held at 85°F.-- to be correct.

Signed and sealed this 30th day of January 1973.

(SEAL)
Attest:

EDWARD M. FLETCHER, JR.
Attesting Officer

ROBERT GOTTSCHALK
Commissioner of Patents